(12) United States Patent
Kando

(10) Patent No.: US 6,527,489 B2
(45) Date of Patent: Mar. 4, 2003

(54) CONCEALED LOW DISTORTING SELF CRIMPING STUD AND INSERTION METHOD

(75) Inventor: Laszlo Kando, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/731,622

(22) Filed: Dec. 7, 2000

(65) Prior Publication Data

US 2002/0071736 A1 Jun. 13, 2002

(51) Int. Cl.7 .......................... F16B 39/00; F16B 37/04; B23P 11/00
(52) U.S. Cl. ..................... 411/107; 411/180; 411/504; 29/511; 29/525.11
(58) Field of Search ................................ 411/107, 177, 411/179, 180, 189, 504; 29/510, 511, 520, 525.11

(56) References Cited

U.S. PATENT DOCUMENTS

| | | | |
|---|---|---|---|
| 3,000,420 A | * | 9/1961 | Spokes ...................... 411/180 |
| 3,556,189 A | * | 1/1971 | Ernest ....................... 411/189 |
| 3,820,579 A | | 6/1974 | Barry |
| 5,114,263 A | | 5/1992 | Kanamaru et al. |
| 5,272,930 A | | 12/1993 | Nakamura et al. |
| 5,579,568 A | | 12/1996 | Hudson et al. |
| 5,870,285 A | | 2/1999 | Kosteva et al. |

FOREIGN PATENT DOCUMENTS

| GB | 987578 | * 3/1965 | ................. 411/177 |
|---|---|---|---|
| GB | 1141879 | * 2/1969 | ................. 411/177 |

* cited by examiner

Primary Examiner—Neill Wilson
(74) Attorney, Agent, or Firm—James J. Cioffi; Delio & Peterson, LLC

(57) ABSTRACT

A stress-free method and apparatus are provided for forming assemblies having thin substrates whereby a permanent non-interference fit low stress stud is positioned and secured evenly into a shallow hole of a thin substrate or host material without introducing uneven stress forces to maintain a flat surface on both sides of the thin substrate. The forces of inserting the stud are applied inward, towards a head portion of the tapered stud by a crimping tool adapted to move the substrate material inward and form a flange over the angled edges of the tapered head portion of the stud to secure the stud to the thin substrate. In doing so, the forces are absorbed by the strong tapered head portion of the stud which is able to withstand the crimping forces and will not be distorted by the inward crimping forces, thus maintaining flat surfaces of the substrate.

27 Claims, 4 Drawing Sheets

CONCEALED LOW DISTORTING SELF CRIMPING STUD AND INSERTION METHOD

BACKGROUND OF THE INVENTION

1. Field of the Invention

The present invention relates to permanent bonds in thin components. More particularly, the invention relates to an improved method and apparatus for mounting a permanent stud on a thin substrate by permitting the thin substrate to receive the permanent stud without distorting the flatness of the substrate.

2. Description of Related Art

A number of mechanical and electromechanical assemblies are composed by using studs or pins, such as standoff studs and threaded studs, which emerge from a surface of a substrate or other structure. In such assemblies, standoff studs may be used to separate one element from another or as axles for rotating parts, while threaded studs may be used to fasten one component of the assembly to another. Typically, studs used in manufacturing mechanical or electromechanical assemblies may be attached or fastened to a surface of a substrate by techniques such as crimping, welding, pressing, screwing, or riveting, whereby a hole is first formed in the substrate and subsequently, the stud is inserted into the hole and attached to the substrate by one of the above attaching techniques.

In the prior art, methods of forming mechanical or electromechanical assemblies using standoff studs and threaded studs are typically two sided fastenings. In such methods, a through hole is formed to traverse through the substrate whereby the stud is inserted into the through hole on a first side of the substrate to traverse through the substrate and exit the through hole at a second side of the substrate. The stud is then typically fastened to the substrate at the second end of the substrate using one of the above conventional fastening techniques. In inserting and attaching the stud at only one end of the through hole, the stud is typically pressure-fitted causing an outward force which undesirably bends the substrate to create a non-planar surface of the substrate or forms a retaining ridge around the stud. For example, U.S. Pat. No. 5,579,568 to Hudson et al. discloses a through hole which deforms the stud at one end of the through hole whereby the stud is expanded against the walls of the through hole creating an outward force. The outward force at the one end of the through hole creates an uneven horizontal force which forms a cone like elevation around the inserted stud, thereby causing a non-planar surface of the substrate.

Alternatively, mechanical or electromechanical assemblies may be created using "dead-end" holes for standoff stud or threaded stud insertion. In such techniques, the stud is attached, crimped, or the like, at only one side of the substrate using an interference or pressed-in fit to achieve the permanent bond. However, as with through hole techniques, such dead-end hole techniques also cause an undesirable non-planar surface of the substrate. For example, FIG. 1 is a cross-sectional view of a conventional, interference fit or pressed-in stud 2 being inserted by a downward force 4 into a one sided dead-end hole 6 on a substrate 8 to achieve the permanent bond. As shown, the stud 2 is inserted into the dead-end hole 6 by the downward pressure 4 whereby outward forces 12 are created and applied against both the stud 2 and walls of the dead-end hole 6. The outward forces 12 are applied unevenly to one side of the substrate only, thereby radially distorting the stud 2 to force portions of the substrate 8 to elevate around the stud 2 to create a cone effect 14 and undesirably cause a non-planar surface of the substrate 8.

As technology advances, and smaller components are increasing desired in the electronics industry, the studs used in forming mechanical or electromechanical assemblies are increasingly being required to be attached to thinner substrates. The techniques known and used in the art for forming mechanical or electromechanical assemblies, such as those using the conventional studs which create uneven outward forces, cause stress to both the stud and the substrate thereby creating non-planar surfaces of both sides of the substrate. In using thin substrates for modem assemblies, any stress to the thin substrates will cause them to undesirably bend or become distorted. As a result, the prior art techniques are not reliable for controlling the formation of the smaller assemblies as well as maintaining a flat surface of the thinner substrates used in such assemblies. Furthermore, the prior art techniques are time consuming, require several fabrication steps, have increased manufacturing costs, and often require a thick substrate to avoid bending or twisting of the substrate when the studs are inserted into such substrate.

Thus, the prior art techniques of inserting and fastening the conventional studs into substrates are not sufficient for modem mechanical or electromechanical assemblies requiring thin substrates. Therefore further improvements are needed in the art of forming modem assemblies which allow for securing studs evenly into a thin substrate without distorting the flatness of the thin substrate.

Bearing in mind the problems and deficiencies of the prior art, it is therefore an object of the present invention to provide an improved, inexpensive method and apparatus for mounting studs evenly into a thin substrate without distorting the flatness of the surface of the substrate, whereby such method and apparatus allows the location of the stud to be placed within very close positional tolerance limits of less than 0.001 inch.

It is another object of the present invention to provide a method and apparatus for inserting and securing a stud into a substrate in a single operation.

A further object of the invention is to provide an improved method and apparatus for inserting and securing a stud into a thin substrate while maintaining a planar surface of the substrate.

Another object of the invention is to provide an improved method and apparatus for inserting and securing a stud into a shallow dead-end hole while maintaining a planar surface of the substrate.

Still another object of the invention is to provide a method and apparatus for inserting and securing a stud into a substrate which provides improved control of the alignment of the stud.

It is yet another object of the present invention to provide a method and apparatus for inserting and securing a stud into a substrate which fulfills the closest positional tolerances allowing for a flat surface finish.

Another object of the invention is to provide a method and apparatus for an insertion tool for use in the above method and apparatus for mounting studs evenly into a thin substrate without distorting the flatness of the surface of the substrate.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of making an assembly component comprising providing a substrate, providing an opening in the substrate, providing a stud having at least one tapered end; and providing a means for positioning the at least one tapered end in the opening in the substrate and securing the stud to the substrate whereby the means applies inward forces to prevent distorting the substrate. The substrate having the stud inserted and secured thereto may then be connected with a second substrate to provide an assembly.

In the preferred embodiment, the thin substrate may comprise an assembly component comprising a lid, cap, heat sink, spreader, or semiconductor having a thickness ranging from about 0.100 inches to about 0.200 inches. The stud having the tapered end is preferably inserted into a blind hole in the substrate and secured thereto the substrate, whereby the blind hole may have a depth ranging from about 0.045 inches to about 0.050 inches.

The stud used in the preferred embodiment preferably comprises a threaded stud or a standoff stud comprising a permanently formable material including metals, plastics, wood, glass, and fiberglass, more preferably the stud comprises stainless steel. The stud preferably further comprises a flank portion and the at least one tapered end of the stud comprises a tapered head portion. The tapered head portion may further comprise knurls thereby providing the tapered head portion with added torque force. In the preferred embodiment, the tapered head portion of the stud comprises an angle of about 15 degrees to about 60 degrees. The angled edges of the tapered head portion of the stud adapt the stud to fit within the opening in the substrate.

The first aspect of the method of making an assembly component further comprises a means for holding the stud, and inserting and securing the tapered end of the stud into the opening in the substrate, or the blind hole in the substrate. The means for holding the stud, and inserting and securing the tapered end of the stud into the opening in the substrate applies inward forces thereby preventing distorting of the substrate. In doing so, the means for holding the stud, and inserting and securing the tapered end of the stud into the opening in the substrate secures the stud to the substrate by moving substrate material inward over the angled edges of the tapered head portion and forms a flange over such angled edges to secure the stud to the substrate.

In the preferred embodiment, the means for holding the stud, and inserting and securing the tapered end of the stud into the opening in the substrate comprises a crimping tool. The crimping tool used in the preferred embodiment is adapted to prevent distorting the substrate by applying the inward forces which cause sidewalls of the opening in the substrate to collapse and form a flange around the angles of the tapered head portion of the stud to secure the stud to the substrate.

In a further aspect, the present invention is directed to a mechanical assembly component comprising a stud having at least one tapered end and a substrate having an opening, preferably a blind hole, on a first side adapted to receive the stud having at least one tapered end, whereby the tapered end of the stud is securely fastened within the opening on the substrate by having a portion of the substrate material moved inward to cover the tapered end of the stud while maintaining a planar surface of the substrate. In such an embodiment, stud having the tapered end secured to the substrate may be connected to a second substrate to provide an assembly.

In the present embodiment, the thin substrate preferably comprises an assembly component comprising a lid, cap, heat sink, spreader, or semiconductor having a thickness ranging from about 0.100 inches to about 0.200 inches. The stud having the tapered end is preferably inserted into the blind hole in the substrate and secured thereto the substrate, whereby the blind hole may have a depth ranging from about 0.045 inches to about 0.050 inches.

The stud of the present assembly preferably comprises a threaded stud or a standoff stud comprising a permanently formable material including metals, plastics, wood, glass, and fiberglass, more preferably the stud comprises stainless steel. The stud preferably further comprises a flank portion and the at least one tapered end of the stud comprises a tapered head portion. The tapered head portion may further comprise knurls thereby providing the tapered head portion with added torque force. In the preferred embodiment, the tapered head portion of the stud comprises an angle of about 15 degrees to about 60 degrees. The angled edges of the tapered head portion of the stud adapt the stud to fit within the opening in the substrate and have a portion of substrate material thereover for securing the stud to the substrate.

In yet another aspect, the present invention is directed to a crimping tool comprising a cylinder having an opening, and an undercut portion and an angled edge on a first end of the cylinder. In the present embodiment, the opening in the cylinder is adapted to receive a stud for insertion into a substrate whereby the undercut portion of said cylinder is adapted to receive the substrate and move substrate material while the angled edge of the cylinder is adapted to receive the substrate material to form a tapered flange over an angled edge of the stud, thereby attaching or securing the stud to the substrate. The crimping tool of the present embodiment is adapted to prevent distorting the substrate by applying inward forces which cause sidewalls of the opening in the substrate to collapse and form a flange around the tapered end of the stud to fasten the stud to the substrate while maintaining a planar surface of the substrate.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
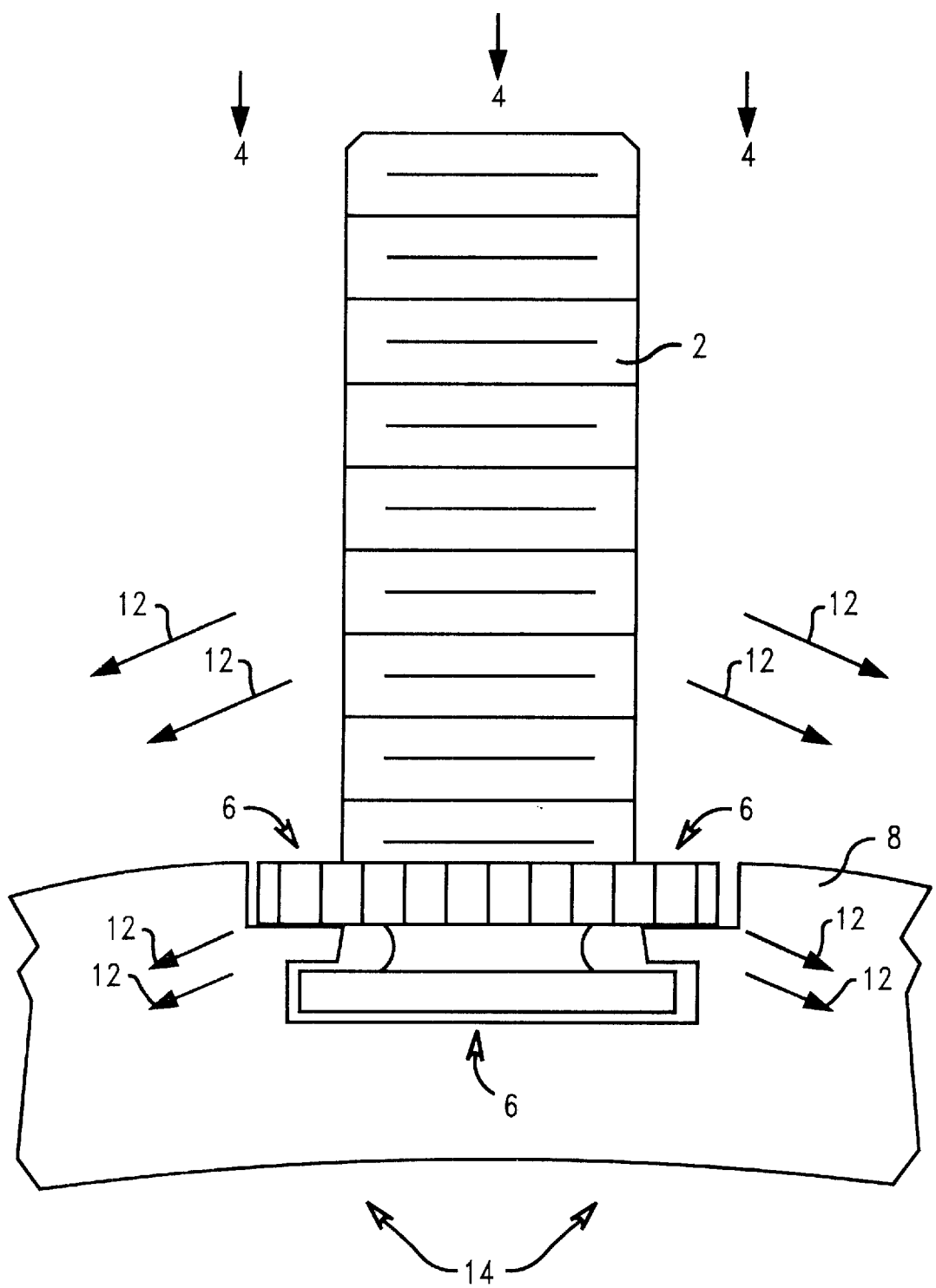
FIG. 1 is a cross-sectional view of a conventional pressed-in stud illustrating the distorting radial affect in a one sided hole created by outward forces applied against the wall of the hole which distort and bend the substrate into which the stud is being inserted.

In describing the preferred embodiment of the present invention, reference will be made herein to FIGS. 1–6 of the drawings in which like numerals refer to like features of the invention. Features of the invention are not necessarily shown to scale in the drawings.

The present invention provides an improved, stress-free method and apparatus for forming assemblies having smaller dimensions, particularly those assemblies having thin substrates. In the present invention a permanent non-interference fit low stress stud is positioned and secured evenly into a shallow hole of a thin substrate or host material without introducing uneven stress forces, thereby maintaining a flat surface on both sides of the thin substrate. The present invention eliminates the distorting or bending problem associated with conventional interference fit or pressed-in studs in a one sided hole using self crimping fasteners as illustrated in the prior art illustration of FIG. 1. As shown in FIG. 1 and discussed above, the prior art methods and apparatus for inserting studs into a hole on one side of a substrate apply outward forces against the walls of the hole, thereby distorting the host plate or substrate and creating a cone effect in the substrate. As the stud continues to be inserted into the substrate by the conventional processes, the cone effect tapers to an uncontrolled twisting and undesirably bends the substrate to cause a non-planar surface on both the undisturbed surface of the substrate as well as the surface having the stud.

Figure 2:
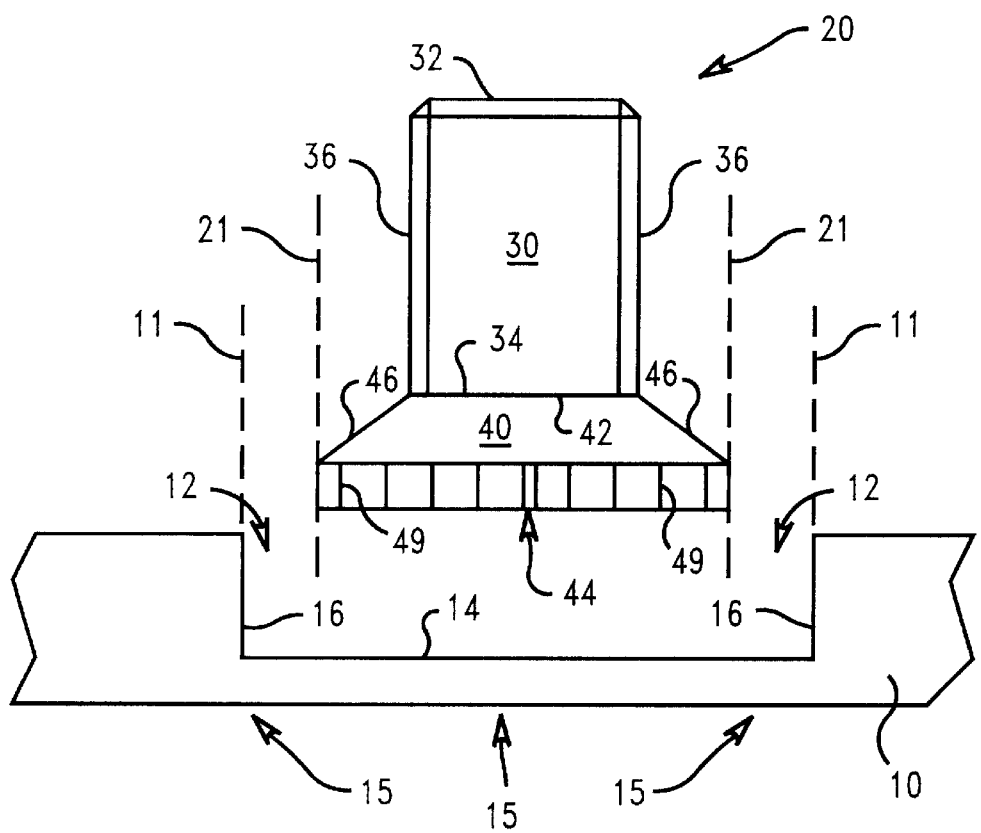
FIG. 2 is a cross-sectional view of a preferred embodiment of the present invention showing a threaded stud having a conical, knurled head and a substrate having a shallow hole adapted to receive the knurled head of the threaded stud.

In the preferred embodiment, the present invention permits a shallow dead-end hole in a thin substrate to receive a permanent stud using an inexpensive crimping method and tool without distorting the flatness of the thin substrate. The crimping tool used in the present invention collects substrate material and moves the substrate material inward over an edge of a tapered end of the stud to secure the stud to the substrate, thus eliminating outward forces applied to the substrate and stud which would distort the substrate. The present invention allows the location of the stud to be placed within very close tolerance limits of less than 0.001 inch, as well as provides for improved control of alignment of the stud. Furthermore, the studs of the present invention are attached firmly and permanently to a first side of the thin substrate in a single operation, while leaving the opposite, second side of the substrate undisturbed from its original condition for subsequent attachment and finishing procedures of the resultant assemblies. The present As illustrated in FIG. 2, in the preferred embodiment of the present invention, a permanent non-interference fit low pressure stud 20, having a flank portion 30 and a conical head portion 40, is provided for insertion into a dead-end shallow hole on a component, or substrate 10, for connection to another component, or substrate, for forming assemblies including mechanical assemblies, electromechanical assemblies, or as will be recognized by one skilled in the art, various other assemblies wherein threaded studs or stand-offs of various shapes are required. As shown in FIG. 2, a portion of substrate 10 is depicted whereby substrate 10 may comprise either a lid, cap, heat sink or spreader. In the preferred embodiment, substrate 10 may be attached to a second substrate to form the resultant assembly, whereby both substrates may comprise lids, caps, heat sinks, spreaders, or any other component used in the art to form such assemblies, and combinations thereof. As will be recognized, the substrates may comprise any conventional material used in forming such assemblies including, for example, steel, ferrous, non-ferrous permanently formable metals, or any other permanently formable non-metallic material having varying thicknesses as known and used in the art. As will be further recognized, wherein the head portion 40 of stud 20 is fabricated using a non-conductive, permanently formable material such as glass, ceramics, plastics, and the like, both electrical and heat transfer insulation will be provided between the substrates used to make the resultant assembly.

Figure 3:
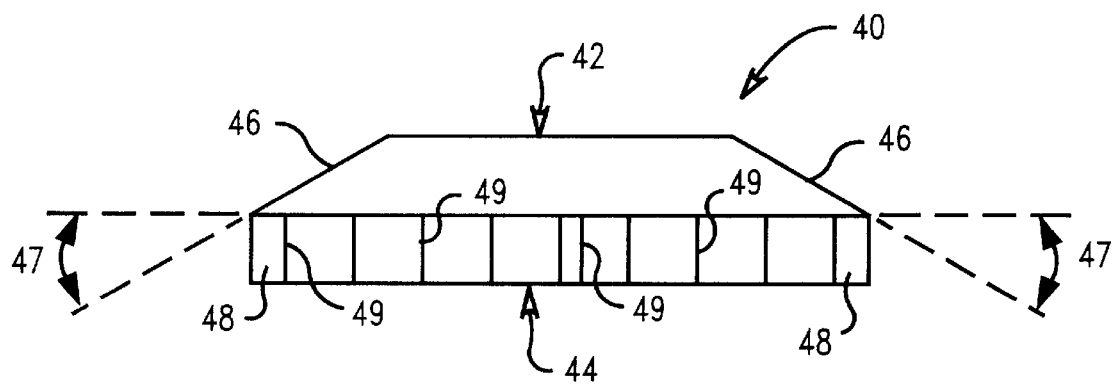
FIG. 3 is a cross-sectional view showing the conical, knurled head portion of the threaded stud of the preferred embodiment of the present invention.

As illustrated in FIGS. 2 and 3, a low pressure stud 20, having the flank portion 30 and the conical head portion 40, is provided for insertion into a hole 12 in the substrate 10. In the preferred embodiment, the low pressure stud 20 may comprise a threaded stud or a standoff stud comprising stainless steel or steel, as well as varying other permanently formable metals and non-metals including plastics, wood, fiberglass, and the like. The flank portion 30 of the stud comprises a first end 32, a second end 34, and a threaded cylinder 36 whereby the flank portion 30 is directly in contact with the tapered, conical head portion 40 as-formed. (See FIGS. 2.) and 3. As will be recognized by one skilled in the art, the length and diameter of the flank portion 30 may vary based on the particular structural and dimensional specification of the final, desired assembly. For example, the length and diameter of the flank portion 30 may vary based on the length of a gap the stud must maintain between two substrates, the thickness of a mating part, or second substrate, the stud must secure, and the like.

The tapered head portion 40 exists at the second end 34 of the flank portion of stud 20. (See FIGS. 2 and 3.) As illustrated in FIGS. 2 and 3, head portion 40 also has a first end 42 and a second end 44. As the second end 34 of the flank portion 30 and the first end 42 of the head portion 40 are directly connected to each other as-formed, they have the same diameter. Furthermore, the second end 44 of the head portion 40 comprises the bottom surface of the low pressure stud 20 while the first end 32 of the flank portion 30 comprises the top surface of the low pressure stud 20 of the present invention. The head portion 40 further comprises smooth, tapered outer edges 46 which effect the conical shape of the tapered head portion 40, and cause the second end 44 to be larger in diameter than the first end 42 of the head portion. The head portion 40 may be tapered by conventional techniques as known and used in the art, such as turning, milling, etching, filing, grinding, forging, casting, and the like. In the present invention, the head portion 40 may be tapered to provide smooth, tapered outer edges 46 having angles 47 ranging from about 15 degrees to about 60 degrees.

Alternatively, as will be recognized by one skilled in the art, the angles 47 of the head portion may be formed to an extent which adapts the head portion of the stud to fit within hole 12 provided in substrate 10. Preferably, the diameter of the bottom surface of the head portion, as depicted by reference numeral 11 in FIG. 2, is smaller in diameter than the diameter of the bottom of hole 12 in the substrate, as depicted by reference numeral 12 in FIG. 2, to avoid any interference of the two components during assembly. As the bottom diameter of the second end 44 of the head portion 40 may depend on the diameter of hole 12, the diameter of the first end 42, the height of the head portion, and the overall height of the stud 20 will also depend on the diameter of hole 12 in the substrate into which the stud 20 is being inserted for securing to the substrate. In the present invention, the overall height of the stud 20 depends on the height of the desired flank portion of the stud in combination with the tapered head portion, whereby the height of the tapered head portion may depend on the angle of degree to which the tapered, conical head portion is formed. (See FIG. 2.)

In the present invention, the tapered head portion 40 of stud 20 preferably further comprises a pilot portion 48 having a height preferably smaller than the depth of the hole 12 in substrate 10 directly connected to the second end 44 of the head portion 40. The pilot portion 48 of the low pressure stud 20 may comprise stainless steel or steel, as well as varying other permanently formable metals and non-metals including plastics, wood, fiberglass, and the like. The pilot portion 48 comprises sidewalls adapted to make a connection with the sidewalls 16 of hole 12 in the substrate, and a flat bottom surface adapted to make a connection with the bottom 14 of hole 12 in the substrate. As the pilot portion is directly connected to the second end 44, the pilot portion and the second end 44 of head portion 40 have the same diameter whereby the flat bottom surface of the pilot portion 48 comprises the second end of the stud 20. (See FIG. 2.) Thus, the pilot portion is preferably smaller in diameter than the diameter of the bottom of the hole 12 formed in the substrate to avoid any interference of the two components during assembly. (See FIG. 2.) For example, in the preferred embodiment of the present invention, the pilot portion is about 0.001 inches smaller in diameter than the diameter of hole 12 thereby avoiding any interference of the two components during assembly.

As further illustrated in FIGS. 2 and 3, the pilot portion 48 of the head of the stud may optionally be knurled or grooved in order to increase the torque resistance of the stud to keep it from turning. The pilot portion 48 may be knurled by conventional techniques as known and used in the art to form a series of straight knurls, small ridges, beads, and the like. The series of small ridges, beads, straight knurls, and the like on the surface of the pilot portion ensure the stud of firmly gripping the substrate, thereby increasing the torque resistance and enhancing the ability of attaching stud 20 to the substrate 10 without deforming and bending either the stud or the substrate. In the preferred embodiment, a series of straight knurls 49 are formed on the surface of the stainless steel pilot portion of the head of stud 20. (See FIGS. 2 and 3.) Furthermore, as will be recognized by one skilled in the art, the head portion 40, having the combined conical structure with the pilot portion, may have a variety of patterns or shapes, including square, hexagonal, circular, or any other shape as desired, whereby the pattern selected conforms to the pattern of the hole 12 formed in substrate 10. Thus, in the present invention the hole 12 and the low pressure stud 20 are adapted to receive each other.

In the preferred embodiment, the low pressure stud comprises a threaded Stainless Steel stud fabricated using a conventional Metal Lathe from one single piece of Stainless Steel, for example from a conventional ⅜ inch diameter commercial 303 series Stainless Steel. The low pressure stud may have a total length ranging from about 0.340 inches to about 0.350 inches. Subsequently, the flank portion 30 having the threaded cylinder and the head portion 40 having angles 47 may be fabricated using conventional techniques such as standard cutting techniques, for example. In the preferred embodiment, the head portion 40 may be fabricated to comprise angles 47 from about 29 degrees to about 31 degrees, even more preferably 30 degrees, with a base diameter ranging from about 0.374 inches to about 0.375 inches, more preferably to about 0.375 inches, while the first end 42 has a diameter smaller than the range of about 0.374 inches to about 0.375 inches. Thereby, the resultant height of the preferred knurled, tapered head portion 40 of the preferred embodiment may range from about 0.10 inches to about 0.20 inches. Further, the flank portion 30 of the preferred embodiment of stud 20, as illustrated in FIG. 2, is cylindrical in shape but it could be a variety of shapes including but not limited to angular, angled, cornered, square, rectangular, oval, circular, and the like, as required by the desired assembly. The head portion 40 can be designed to be identical to the flank portion 30 or alternatively, it may be any other shape as required by the desired assembly.

The substrate 10 is provided with the opening or hole 12. The hole 12 may be formed in the substrate by techniques as known and used in the art such as drilling, milling, turning, and the like. Preferably, hole 12 is a shallow, blind hole formed on one side only of the substrate to a depth ranging from about 0.025 inches to about 0.030 inches deeper than the height of the knurled pilot portion 48 of the head portion 40. The shallow, blind hole 12 may be formed by any conventional technique as known and used in the art, which enables the operator to produce the hole diameter for tolerance of less than 0.001 inches and depth tolerance of less than 0.010 inches. Furthermore, hole 12 may be formed to have a diameter and shape that will accommodate the selected low pressure stud 20 which is subsequently inserted into hole 12. In the present invention, hole 12 may have a shape including, for example, square, hexagonal, circular, or any other shape as desired, and a dimension larger, but not more than 0.001 inches larger than the bottom diameter of the head portion, thereby adapting hole 12 to receive the low pressure stud 20. As further illustrated in FIG. 2, hole 12 further comprises the flat bottom portion 14 and the pair of sidewalls 16 which are preferably not counter-bored thus enabling increased material to remain around hole 12 for deforming over the smooth edges 46 of the head portion 40, thereby adapting the stud 20 to be strongly secured to the substrate.

Figure 4:
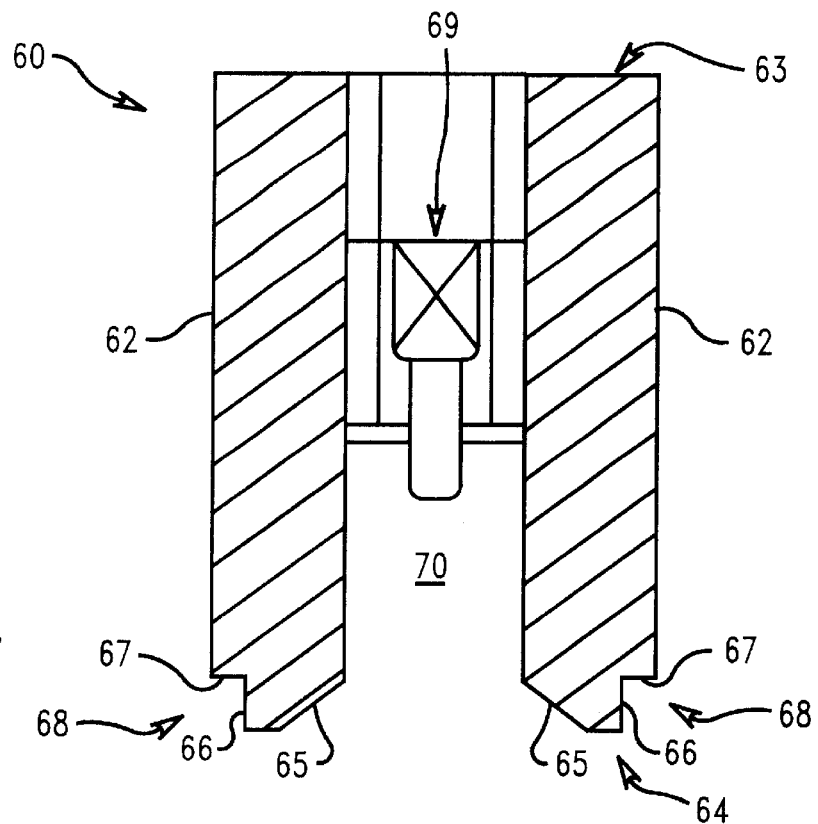
FIG. 4 is a cross-sectional view illustrating the preferred embodiment of the insertion tool of the present invention which is adapted to hold, insert and secure the threaded stud having the knurled head into the shallow hole of the substrate.

Subsequently, the head of the stud is inserted into hole 12 of the substrate with the use of an insertion tool, such as a crimping tool. FIG. 4 illustrates the preferred embodiment of the insertion tool of the present invention comprising a crimping tool 60 adapted to insert the low pressure stud 20, having the tapered head portion, into the shallow hole 12 of substrate 10. The crimping tool 60 holds, positions, and secures the stud 20 into the substrate in one single process, whereby after the stud is inserted into hole 12 the crimping tool 60 is adapted to collapse the sidewalls 16 of the hole using an inward force to securely fasten the stud to the substrate.

As illustrated in FIG. 4, crimping tool 60 may comprise a conventional spring loaded threaded plunger 69 placed in the center of an opening 70 whereby the spring loaded threaded plunger 69 is completely surrounded by cylinder 62 of the crimping tool. As will be recognized by one skilled in the art, spring loaded threaded plunger 69 may be a conventional spring loaded threaded plunger adapted to fit the flank portion of the stud 20. In the present invention, the spring loaded threaded plunger 69 is adapted to hold the flank portion of the stud and subsequently position the bottom of the head portion of the stud on the bottom surface 14 of the hole 12. The spring loaded threaded plunger 69 is further adapted to position and making a direct, continuous contact between the bottom of the stud and the bottom of hole 12, and subsequently maintain the stud 20 firmly against the bottom surface 14 of the hole 12 during the bonding, securing, or crimping of stud into the hole 12 of substrate 10. As will be recognized, the opening 70 is designed to be larger in diameter than the diameter of the flank portion 30 of the stud, thereby adapting the crimping tool to receive the low pressure stud 20 and allow free movement of the flank inside opening 70. In the preferred embodiment, the opening is fabricated to have a diameter ranging from about 0.003 inches to about 0.008 inches larger than the diameter of the flank portion 30 of the stud.

In the present invention, the cylinder 62 of the crimping tool 60 comprises top and bottom portions, 63 and 64 respectively. The bottom portion 64 of cylinder 62 is adapted to form a tapered flange 98 over and around the outer edges 46 of the head portion 40 of the present low pressure stud 20. (See FIG. 6.) The bottom portion 64 of the cylinder 62 of the crimping tool 60 comprises an undercut portion 68 for receiving an edge of an upper portion of walls 16 of hole 12 and an angled edge 65 adapted to form an angled build-up of substrate material around the tapered head portion which forms the tapered flange 98 around and over the outer edges 46 of the head portion 40 to firmly secure the stud in the substrate 10. (See FIG. 4.) The undercut portion 68, having an upper surface 67 and a sidewall 66, encompasses both the opening 70 and the cylinder 62 of the insertion tool 360 degrees. As will be recognized, the height of sidewall 66 and the depth of upper surface 67 will depend on the angles of degree at which the tapered edges 46 of the head portion 40 are formed as well as the height of the head portion 40. The combined sidewall 66 and upper surface 67 are used as a guide to mark the length of travel necessary for the insertion tool 60 to press the cylinder 62 into substrate 10 for securing the stud to the substrate.

As mentioned above, in adapting the bottom portion 64 of the crimping tool to compress the tapered flange around a portion of the head portion of the stud, the bottom portion is provided with the angled edge 65 which is adapted to form an angled build-up of substrate material which forms the tapered flange 98 around and over the outer edges 46 of the head portion 40. (See FIGS. 5 and 6.) The angled edge 65 has an angle which when combined with angle 47 of the tapered edges 46 of the head portion provides 180 degrees, or a straight line. For example, in the preferred embodiment, wherein the angle 47 of the tapered edge of the head portion are angled to 30 degrees, the angle of the angled edge 65 will be 150 degrees from the horizontal, thereby being adapted to receive the head portion of the stud and form the flange 98 over the edge of the head portion. (See FIGS. 5 and 6.) Furthermore, the undercut portion 68 acts as a gauge to regulate the volume of material to be deformed over the edges 46 of the head portion during the crimping procedure using the crimping tool 60 of the present invention. In doing so, the tool may be inserted to the height of the sidewalls 66, stopping at the upper surface 67 of the undercut sections 68.

Figure 5:
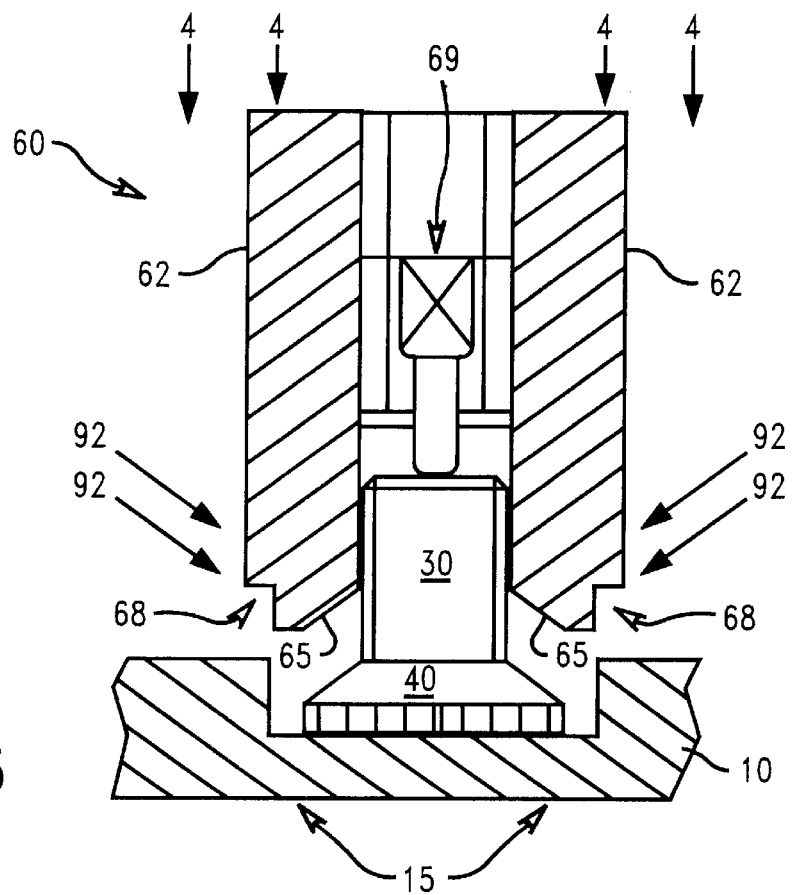
FIG. 5 is a cross-sectional view showing the insertion tool of FIG. 4 inserting a threaded stud having the knurled head into the shallow hole on the substrate thereby creating inward forces which are applied against the head of the stud to maintain the form of the stud and the substrate into which the stud is being inserted.
Figure 6:
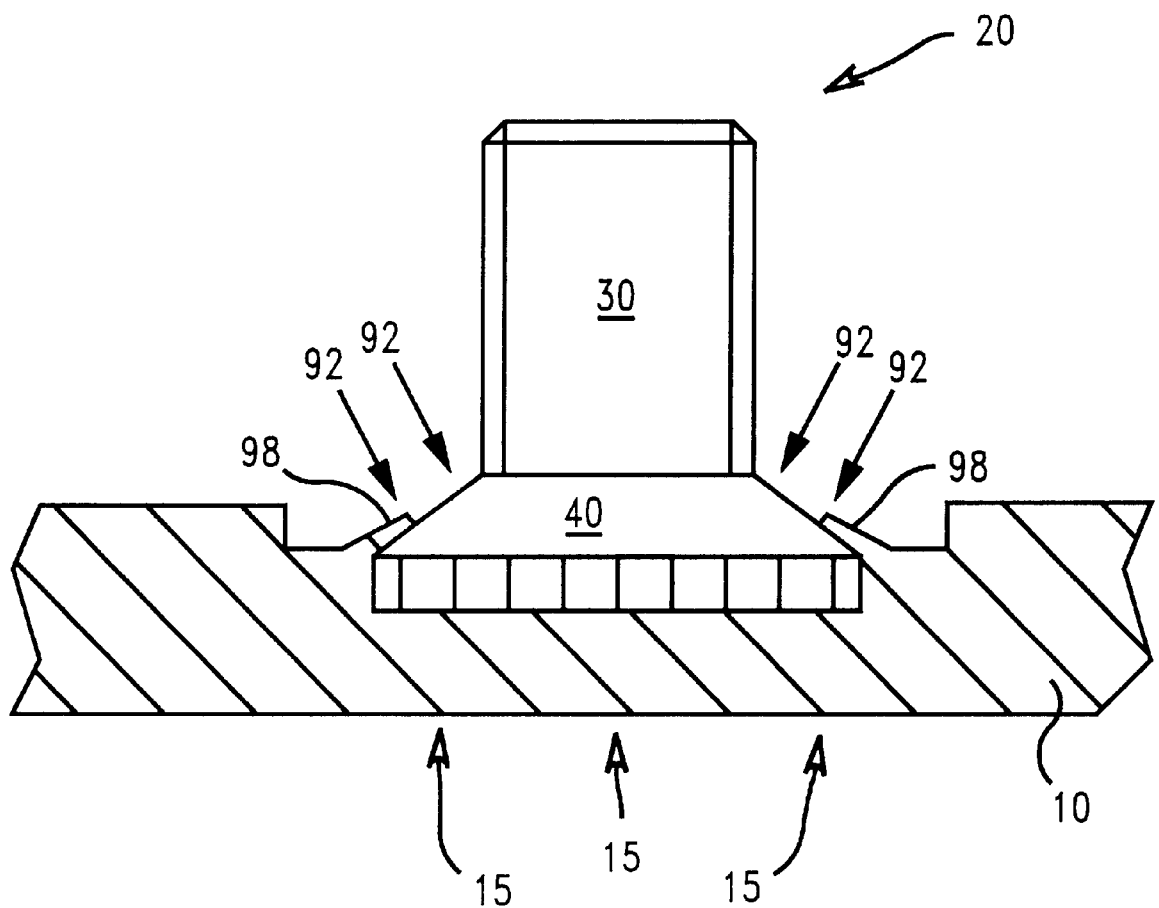
FIG. 6 is a cross-sectional view of the threaded stud of the present invention inserted into the shallow hole on the substrate by the insertion tool of the present invention. As illustrated, the substrate material plastically deforms and embraces the threaded stud with the knurled head to secure the threaded stud in place on the substrate assuring positional tolerances of less than 0.001 inch.

As illustrate in FIG. 5, the crimping tool 60 is adapted to receive the stud 20 for insertion into the substrate 10. In the present invention, the stud may be placed first on the bottom surface 14 of the hole 12, and subsequently the insertion tool 60 is provided over the stud as shown in FIG. 5 to receive the flank portion of the stud. Once the low pressure stud 20 is loaded into the crimping tool 60, and the spring loaded plunger holds the bottom of the stud 20 in position with the bottom of hole 12, stud 20 is subsequently securely fastened to the substrate without bending the underside 15 of the substrate. In securely fastening the low pressure stud 20 to the substrate a downward pressure 4 is applied to the cylinder 62 to force the sidewall 66 of the undercut portion 68 into the substrate, whereby the sidewall 66 of the undercut portion 68 is inserted into the substrate stopping at the upper surface 67 of the undercut portion 68. In doing so, the angled flange 65 of the cylinder applies inward forces 92 on the head 40 (FIG. 2) which are directed toward the center of the head portion 40 of the stud 20. As the cylinder 62 is inserted into the substrate, the substrate material of the sidewalls of the hole become distorted and collapse, thus plastically deforming the substrate material to form a lip 98 (FIG. 6) comprising the substrate material which embraces the head portion of the stud 20 to securely fasten the stud to the substrate. (See FIG. 6.) In doing so, the head portion 40 of the stud 20, having a strong conical construction with more strength toward the center, is able to withstand the inward crimping forces 92, thereby maintaining the substrate's forces in equilibrium to prevent tensions and avoiding distorting or bending of the undisturbed side 15 of the substrate. (See FIG. 6.)

In the present invention, the tapered head portion 40 of the low pressure stud 20 comprises a strong conical construction, having more strength toward the center of the head portion. The low pressure stud 20 is adapted to retain its shape at elevated pressures generated when edges 16 of hole 12 in substrate 10 are bent over a surface of the smooth, tapered outer edges 46 of the head portion to form the flange 98 during the process of securing the low pressure stud 20 to the substrate 10. (See FIGS. 2 and 5.) In the present invention, as the low pressure stud 20 is positioned and secured into the substrate using the insertion tool 60, undesired distorting inward forces 92 are applied towards the substrate and the stud. The head portion 40 of stud 20, having more strength toward the center of its strong conical construction, absorbs all undesired distorting inward forces 92, radiating zero or minimal bending forces through surface 14 of hole 12 in substrate 10, thereby not distorting or bending substrate 10 and maintaining smooth, flat surfaces on both sides of the substrate. By having the increased strength near the center of the head portion, the present stud can withstand increased crimping pressures at equilibrium, thereby avoiding any tensions in the substrate and preventing bending of the substrate. (See FIG. 6.)

Thus, the present invention provides a method and apparatus for forming a permanent low pressure stud for insertion into a shallow hole on a thin substrate to provide an assembly without distorting or bending the substrate. The forces of inserting the stud of the present invention are applied inward, towards the head of the tapered stud, which is contrary to conventional stud insertion methods whereby the forces are absorbed by the strong tapered head portion of the stud. The head portion of the non-interference fit low stress stud of the present invention is strong and rigid in structure thus being able to withstand the crimping forces and will not be distorted by the inward crimping forces. As the head portion of the stud absorbs the inward forces or pressures applied to the stud and substrate for insertion of stud 20 into thin substrate 10, the undisturbed bottom of the thin substrate remains flat both during insertion of the stud as well as after the stud was inserted. The present invention may be used to make assemblies in small precision parts and components with ease, as well as eliminate the extra fabricating procedures and the expensive manufacturing operations of the conventional methods of inserting conventional fasteners into a substrate. As the present invention does not bend or distort the thin substrate into which the low pressure stud is inserted, additional re-machining processes as well as resting times are not required. Thus, in the present invention provides an improved, simple, and inexpensive method and apparatus for attaching heat sinks to the back of lids without bending the lids.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention,
What is claimed is:

1. A mechanical assembly component comprising:
   a stud comprising;
   a flank portion;
   a tapered, conical head portion directly connected to said flank portion, said flank portion and said tapered, conical head portion having a same diameter; and
   a substrate having an opening on a first side adapted to receive said stud, said opening having sidewalls;
   wherein said tapered, conical head portion is securely fastened in said opening on said first side of said substrate by a portion of said sidewalls compressed inward by inward forces to cover a portion of said tapered, conical head portion, said head portion having a strong conical structure with more strength toward a center of the head portion thereby enabling said head portion to withstand said inward forces directed at the center of said head portion and prevent distorting the substrate.

2. The assembly of claim 1 wherein said stud secured to said substrate is adapted to connect to a second substrate to provide an assembly.

3. The assembly of claim 1 wherein said substrate comprises a lid, cap, heat sink, spreader, or semiconductor.

4. The assembly of claim 1 wherein said substrate has a thickness ranging from about 0.100 inch to about 0.200 inch.

5. The assembly of claim 1 wherein said opening comprises a blind hole.

6. The assembly of claim 5 wherein said blind hole has a depth ranging from about 0.045 inch to about 0.050 inch.

7. The assembly of claim 1 wherein said stud further comprises a flank portion and said at least one tapered end comprises a tapered head portion.

8. The assembly of claim 1 wherein said tapered, conical head portion further comprises a pilot portion having knurls adapted to provide added torque force.

9. The assembly of claim 1 wherein said tapered, conical head portion of said stud comprises an angle of about 15 degrees to about 60 degrees.

10. The assembly of claim 1 wherein said stud comprises a threaded stud or a standoff stud.

11. The assembly of claim 1 wherein said stud comprises a permanently formable material selected from the group consisting of metals, plastics, wood, glass, and fiberglass.

12. The assembly of claim 1 wherein said tapered, conical head portion of said stud further comprises angled edges for adapting said stud to fit within said opening in said substrate, said angled edges having said portion of substrate material thereover.

13. A method of making an assembly component comprising:
   providing a substrate;
   providing an opening having sidewalls in said substrate;
   providing a stud, the stud comprising;
   a flank portion;
   a tapered, conical head portion directly connected to said flank portion, said flank portion and head portion having a same diameter; and
   providing a crimping tool for positioning said tapered, conical head portion in said opening in said substrate and securing said stud to said substrate whereby said crimping tool applies inward forces to collapse the sidewalls of said opening to form a tapered flange around said tapered, conical head portion thereby preventing distorting said substrate.

14. The method of claim 13 further including connecting said substrate having said stud secured thereto to a second substrate to provide an assembly.

15. The method of claim 13 wherein said substrate comprises an assembly component comprising a lid, cap, heat sink, spreader, or semiconductor.

16. The method of claim 13 wherein said substrate has a thickness ranging from about 0.100 inch to about 0.200 inch.

17. The method of claim 13 wherein said opening comprises a blind hole.

18. The method of claim 17 wherein said a blind hole has a depth ranging from about 0.045 inch to about 0.050 inch.

19. The method of claim 13 wherein said tapered, conical head portion further comprises a pilot portion adapted to make a connection with said sidewalls of said opening.

20. The method of claim 19 wherein said tapered, conical head portion further comprises knurls adapted to provide added torque force.

21. The method of claim 13 wherein said tapered, conical head portion of said stud comprises an angle of about 15 degrees to about 60 degrees.

22. The method of claim 13 wherein said stud comprises a threaded stud or a standoff stud.

23. The method of claim 13 wherein said stud comprises a permanently formable material selected from the group consisting of metals, plastics, wood, glass, and fiberglass.

24. The method of claim 23 wherein said permanently formable comprises stainless steel.

25. The method of claim 13 wherein said tapered, conical head portion of said stud further comprises angled edges for adapting said stud to fit within said opening in said substrate whereby said crimping tool for positioning said tapered, conical head portion in said opening moves substrate material inward over said angled edges to secure said stud to said substrate.

26. The method of claim 13 wherein said crimping tool comprises angled edges adapted to form said tapered flange around said tapered, conical head portion.

27. The method of claim 13 wherein said crimping tool is adapted to prevent distorting said substrate by applying said inward forces which are directed to a center of said head portion, said head portion having a strong conical structure with more strength toward the center of the head portion thereby enabling said head portion to withstand said inward crimping forces and prevent distorting the substrate.

* * * * *